D. F. LONDT.
GOVERNOR FOR TRACTOR ENGINES.
APPLICATION FILED JUNE 6, 1919.
1,331,161.                                     Patented Feb. 17, 1920.
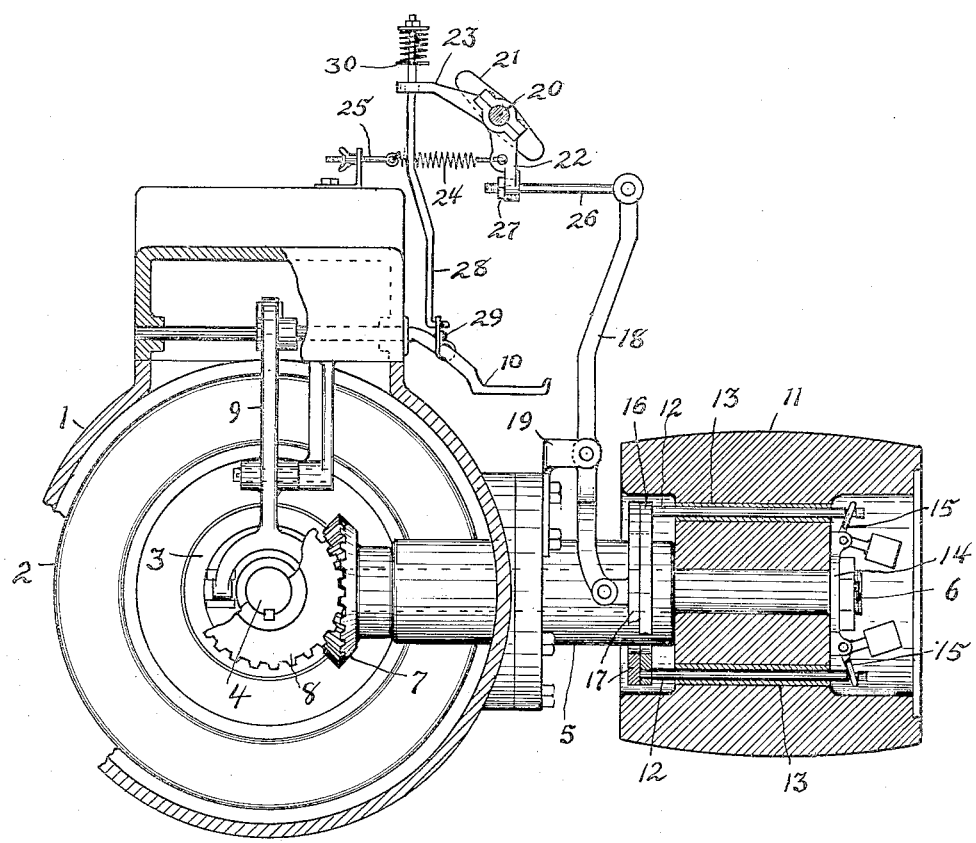
David Franklin Londt INVENTOR
BY
H. G. Burns ATTORNEY

UNITED STATES PATENT OFFICE.

DAVID F. LONDT, OF COLUMBIA CITY, INDIANA.

GOVERNOR FOR TRACTOR-ENGINES.

1,331,161.   Specification of Letters Patent.   Patented Feb. 17, 1920.

Application filed June 6, 1919. Serial No. 302,338.

*To all whom it may concern:*

Be it known that I, DAVID FRANKLIN LONDT, a citizen of the United States of America, and resident of Columbia City, in the county of Whitley and State of Indiana, have invented certain new and useful Improvements in Governors for Tractor-Engines, of which the following is a specification.

This invention relates to improvements in governors for tractor engines, and the objects thereof are to provide means for governing the speed of the engine when the tractor is used for driving a belt, and to provide means for automatically throttling the supply of fuel to the engine when the clutch is thrown out of action.

The objects of the improvement are accomplished by the construction illustrated in the accompanying drawing which is a transverse vertical section through the transmission housing of a tractor and including the belt pulley and throttle rod, and showing also the present invention in connection therewith.

The transmission housing, and its contained mechanism including the belt pulley proper, and the throttle rod and throttle lever are of known construction and arrangement, and the other parts of the invention are shown in a form suited particularly to that construction and may be altered as necessity may arise when the invention is employed in connection with tractors that differ in construction from the example.

Within the housing 1 is the engine fly wheel 2 and the clutch 3 which engages it and imparts movement to the transmission shaft 4. A bearing 5 is mounted in connection with the housing and has a counter shaft 6 journaled therein upon the inner end of which is fixed a gear 7 that is engaged by a companion gear 8 on the transmission shaft 4. 9 is a pivoted clutch lever and 10 is a clutch pedal for actuating the lever. The clutch, clutch lever and the pedal are constructed so that when the pedal is moved downwardly the clutch is drawn out of engagement with the engine.

The belt pulley 11 is fixed upon the outer end of the counter shaft 6 and has two longitudinally movable rods 12 extending through its web, there being corresponding bushings 13 in the pulley through which the rods freely move. A bracket 14 is centrally fixed to the pulley and has pivotally mounted therein weighted levers 15 which have actuating connection respectively with the outer ends of the corresponding rods 12, the levers being so constituted as to move the rods 12 inwardly with more or less force accordingly as the velocity of the pulley varies. Upon the inner ends of the rods is fixed a bearing ring 16 in concentric relation with the pulley and a second bearing ring 17 is supported by a forked lever 18 which is pivoted on a bracket 19 that is mounted in connection with the housing. The ring 17 normally bears against the former ring 16 and is adapted to be moved thereby. In this example the throttle rod 20 and the throttle lever 21 mounted thereon are of the oscillating type and function in the control of fuel supplied to the engine by oscillating movement. Upon the throttle rod are fixed two arms 22 and 23, movement of which actuates the throttle rod, and a tension spring 24 has connection with one of the arms and with an adjusting bolt 25 which tends to hold the throttle lever in open position. A connecting rod 26 is pivoted to the upper end of the forked lever 18 and extends loosely through the arm 22 with an adjusting nut 27 on its extending end arranged to bear against the arm and move it in opposition to the action of the spring 24 when the lever 18 is accordingly actuated so that the throttle rod is turned toward its closed position. Through the arm 23 loosely extends a connecting rod 28 which has connection at its lower end with the clutch pedal 10 through the medium of a clip 29 fixed on the latter. A spring pressed buffer 30 is mounted upon the extending end of the connecting rod 28 and is adapted to bear against the arm 23 and move it downwardly when the clutch pedal is accordingly actuated so as to turn the throttle rod toward its closed position.

In the operation of the invention the throttle rod is normally held in open position by the action of the spring 24 and as a consequence a full supply of fuel is admitted to the engine. When the pulley attains a speed in excess of its normal velocity the weighted levers, because of centrifugal force, actuate the rods 12 causing them to press the rings 16 against the companion ring 17 so that the lever 18 is actuated in effecting closing movement of the throttle rod, thus reducing the supply of fuel to the engine. The centrifugal force effecting the weighted levers results in turning the throttle rod in opposition to the tension of the spring 24, and by increasing or decreasing the tension of the latter the speed of the engine may be fixed. In the event the clutch pedal is actuated and the engine consequently allowed to run free the throttle rod is thereby turned toward its closed position through the medium of the connecting rod 28, buffer 30 and arm 23, thus reducing the supply of fuel to the engine which prevents it from "racing." This feature of the invention enables the operator to throw the clutch out of action, as when shifting the gears of the transmission mechanism, without the necessity of manipulating the throttle rod by hand.

What I claim is:

1. In apparatus including an engine, clutch mechanism, transmission shaft and countershaft in coöperative relation, and a throttle-rod for controlling the engine, a pulley fixed on the countershaft; weighted governor levers pivoted in the pulley and having a bearing member in connection therewith to be actuated thereby; a pivoted lever having a bearing member operatively engaged by the former bearing member; connecting means between the lever and the throttle-rod to turn the latter toward its closed position; a spring tending to hold the throttle-rod in open position; and connecting means between the throttle-rod and clutch mechanism adapted to turn the former toward closed position as the latter is thrown out of engagement with the engine.

2. In apparatus including an engine, a throttling mechanism and a pulley mounted in driven relation with the engine, a pair of weighted levers pivoted oppositely in one end of the pulley; companion rings concentrically arranged in the opposite end of the pulley having bearing relation with each other; connecting members extending longitudinally in the pulley having actuating relation respectively between the weighted levers and one of said rings; and a supporting lever for the other ring, having actuating relation with the throttling mechanism.

In testimony whereof I affix my signature, in presence of two witnesses.

DAVID F. LONDT.

Witnesses:
 MATILDA METTLER,
 WALTER G. BURNS.